Jan. 19, 1965

G. M. SIEGER ETAL 3,166,474

STABLE AQUEOUS PROPYLENE GLYCOL SOLUTIONS OF ALUMINUM
GLUCONATE COMPLEXES OF CERTAIN
TETRACYCLINE ANTIBIOTICS

Filed May 26, 1961

INVENTORS
EDWARD GRANT REMMERS
GEORGE MADISON SIEGER
WILLIAM CHARLES BARRINGER
BY
ATTORNEY.

INVENTORS
EDWARD GRANT REMMERS
GEORGE MADISON SIEGER
WILLIAM CHARLES BARRINGER
BY
ATTORNEY

Jan. 19, 1965

G. M. SIEGER ETAL 3,166,474

STABLE AQUEOUS PROPYLENE GLYCOL SOLUTIONS OF ALUMINUM
GLUCONATE COMPLEXES OF CERTAIN
TETRACYCLINE ANTIBIOTICS

Filed May 26, 1961

INVENTORS
EDWARD GRANT REMMERS
GEORGE MADISON SIEGER
WILLIAM CHARLES BARRINGER
BY
ATTORNEY

INVENTORS
EDWARD GRANT REMMERS
GEORGE MADISON SIEGER.
WILLIAM CHARLES BARRINGER
BY
ATTORNEY

United States Patent Office 3,166,474
Patented Jan. 19, 1965

3,166,474
STABLE AQUEOUS PROPYLENE GLYCOL SOLUTIONS OF ALUMINUM GLUCONATE COMPLEXES OF CERTAIN TETRACYCLINE ANTIBIOTICS
George Madison Sieger, East Paterson, N.J., William Charles Barringer, Pearl River, N.Y., and Edward Grant Remmers, Ridgewood, N.J., assignors to American Cyanamid Company, Stamford, Conn., a corporation of Maine
Filed May 26, 1961, Ser. No. 116,644
1 Claim. (Cl. 167—65)

This invention relates to parenteral preparations of certain tetracycline antibiotics which may be represented by the following structural formula:

wherein $R_1$ is hydrogen or chlorine, and $R_2$ is hydrogen, hydroxyl or methyl, with the proviso that when $R_1$ is chlorine then $R_2$ is hydroxy. More particularly, this invention relates to complexes formed from the above-defined tetracycline antibiotics, aluminum, and gluconic acid, and to methods of making these complexes, and the addition complexes of calcium and magnesium therewith.

The tetracycline antibiotics involved in the present invention are 6-deoxy-6-demethyltetracycline, 6-demethyltetracycline, 6-deoxytetracycline, and 7-chloro-6-demethyltetracycline. These tetracyclines are somewhat similar in many of their characteristics although the individual solubilities and physical properties differ to some extent. The preparation and properties of these tetracycline antibiotics are more fully described in U.S. Patent 2,878,289 to McCormick et al., and by Stephens et al., J.A.C.S. 80, 5324 (1958).

It is desirable to be able to administer broad spectrum antibiotics parenterally, as in many instances a subject is unwilling or unable to swallow or accept them orally, and for animals, particularly, it may be difficult to administer the material orally. If administered orally, there is always a question as to whether or not the subject actually ingested the antibiotic.

It has now been found that 6-deoxy-6-demethyltetracycline, 6-demethyltetracycline, 6-deoxytetracycline, and 7-chloro-6-demethyltetracycline from parenterally suitable complexes with aluminum and gluconic acid. These complexes are not of a simple nature but have a definite composition. The complexes may contain from 1 to 6 moles of aluminum per mole of the antibiotic, and from 1 to 28 moles of gluconic acid per mole of the antibiotic. The number of moles of acid is preferably at least as great as the number of moles of aluminum. These complexes additionally have the beneficial characteristic of forming parenterally suitable complexes with calcium or magnesium in which the calcium or magnesium cations add on to the antibiotic-aluminum-gluconic acid complex. Varying proportions of calcium or magnesium may be added to form the stable complexes. For example, these complexes may contain from 1 to 6 moles of aluminum per mole of the antibiotic, from 1 to 9 moles of calcium or magnesium cations per mole of the antibiotic, and from 1 to 28 moles of gluconic acid per mole of the antibiotic.

The physical characteristics of the complexes of the present invention are unique and unusual. For example, the water solubilities are particularly unusual. A 6-demethyltetracycline-aluminum-gluconic acid complex in the molar ratio of 1:4:6.6 was found to be quite soluble in water and the pH of the solution could be adjusted to 7 or above without precipitation. Similarly, a 6-demethyltetracycline-aluminum-calcium-gluconic acid complex in the molar ratio of 1:4:5:12 was found to be quite soluble in water and the pH of this solution could be adjusted up to 6.5 without precipitation. The exact characteristics of the complexes vary, depending upon the antibiotic being employed, and also upon whether or not the complex formed with aluminum and gluconic acid is further complexed with calcium or magnesium. Variations in the molar ratios of the components cause variations in the apparent characteristics.

In U.S. Patent 2,736,725 to Ritter are disclosed the antibiotic-aluminum-gluconic acid complexes and the antibiotic-aluminum-calcium-gluconic acid complexes of certain tetracycline antibiotics which may be represented by the following structural formula:

Figure 1:
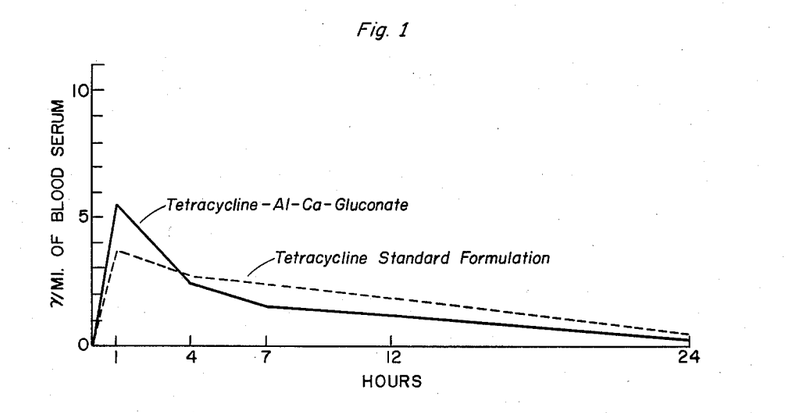
Figure 8:
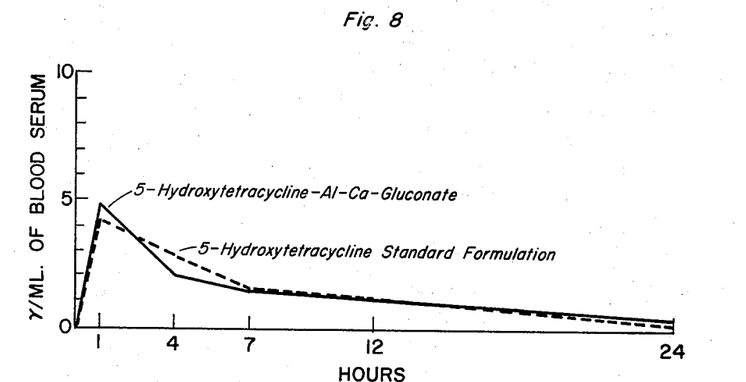

wherein $R_3$ is hydrogen or hydroxy, and $R_4$ is hydrogen, chlorine or bromine, with the proviso that when $R_3$ is hydroxy then $R_4$ is hydrogen. These parenterally suitable complexes give higher maximum blood levels of antibiotic than standard formulations of these antibiotics. However, the higher maximum blood levels obtained with these complexes are achieved at the expense of blood level duration. For example, when a tetracycline-aluminum-calcium-gluconate complex and a tetracycline standard formulation were administered intramuscularly to dogs, the complex gave a higher maximum blood level of antibiotic than the standard formulation as shown by the data which are tabulated in Table I below and plotted graphically in FIGURE 1 of the drawings. Similarly, when a 5-hydroxytetracycline-aluminum-calcium-gluconate complex and a 5-hydroxytetracycline standard formulation were administered intramuscularly to dogs, the complex gave a higher maximum blood level of antibiotic than the standard formulation as shown by the data which are tabulated in Table I below and plotted graphically in FIGURE 8 of the drawings.

TABLE I

*Intramuscular dog blood levels*

[Dose: 2.5 mg. antibiotic injected per pound of dog body weight]

| Sample | Blood Levels, γ of antibiotic/ml. | | | | AUC,[1] γ-hours/ ml. |
|---|---|---|---|---|---|
| | 1 hr. | 4 hr. | 7 hr. | 24 hr. | |
| Tetracycline-Al-Ca-Gluconate (1:4:5:12 molar ratio) | 5.40 | 2.43 | 1.57 | 0.30 | 36.3 |
| Tetracycline Standard Formulation [2] | 3.75 | 2.70 | 2.50 | 0.48 | 44.7 |
| 5-hydroxytetracycline-Al-Ca-Gluconate (1:4:5:12 molar ratio) | 4.80 | 2.04 | 1.32 | 0.32 | 31.6 |
| 5-hydroxytetracycline Standard Formulation | 4.25 | 2.80 | 1.44 | 0.21 | 33.1 |

[1] Area under the blood level-time curve for a period of 24 hours. The "area under curve" is referred to as AUC and is expressed in units of γ-hours per ml. The 24 hour AUC is readily computed using the following formula:

$$AUC = 2y_1 + 3y_4 + 10y_7 + 8.5y_{24}$$

where $y_1$ is the one hour blood level,
$y_4$ is the four hour blood level,
$y_7$ is the seven hour blood level,
and
$y_{24}$ is the twenty four hour blood level.

The 24 hour AUC is a measure of blood level duration and is a more critical factor than maximum blood level of antibiotic obtained.

[2] The standard intramuscular formulation used in all the blood level studies reported herein is a physical mixture having the following composition:

|  | Mg. |
|---|---|
| Antibiotic hydrochloride | 100 |
| Magnesium gluconate | 330 |
| Citric acid | 50 |
| Xylocaine base | 33 |
| Niacinamide | 100 |

However, the 24 hour AUC was lower in each case for the complexes than for the standard formulations. Hence, it is clear that the complexes of these tetracycline antibiotics give higher maximum blood levels whose benefit is largely illusory since an inversion in the blood level duration is obtained.

In view of these results obtained with the complexes of the tetracycline antibiotics described by Ritter, it would be expected that the corresponding complexes of the tetracycline antibiotics of the present invention would also give higher maximum blood levels of antibiotic than their standard formulations but accompanied by an inversion in the 24 hour AUC values. Surprisingly, however, the complexes of the tetracycline antibiotics of the present invention not only give much higher maximum blood levels of antibiotic than their standard formulations but this increase is not accompanied by any inversion in the 24 hour AUC values. Contrariwise, a marked increase in the 24 hour AUC values is obtained with the complexes of the tetracycline antibiotics of the present invention as compared with their standard formulations. The magnitude of this unexpected result is strikingly shown by the intramuscular dog blood level data tabulated in Tables II and III below and plotted graphically in FIGURES 2, 3, 4, 5, 6, 9, 10, and 11 of the drawings, and by the intramuscular rat blood level data tabulated in Table IV below and plotted graphically in FIGURE 7 of the drawings.

TABLE II

*Intramuscular dog blood levels*

[Dose: 2.5 mg. antibiotic injected per pound of dog body weight]

Figure 2:
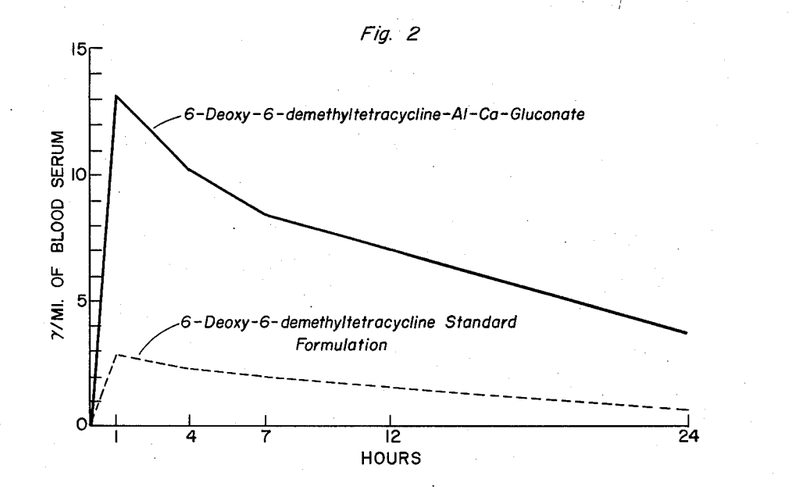
Figure 3:
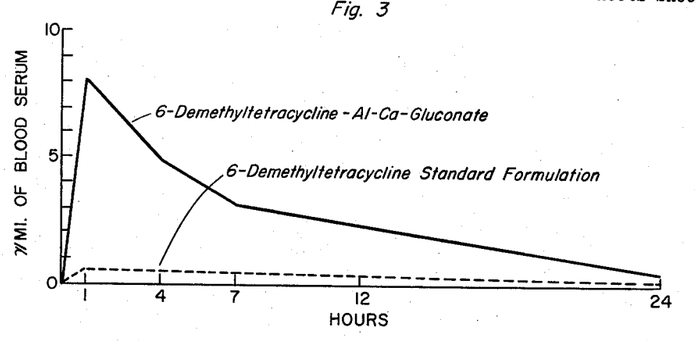
Figure 4:
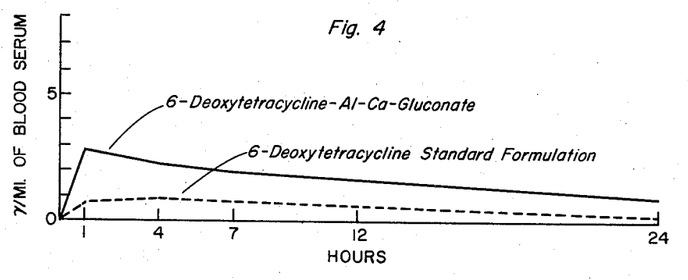
Figure 5:
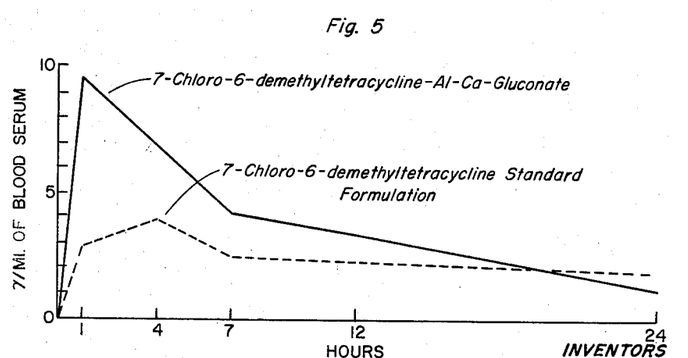

| Sample | Blood Levels, γ of antibiotic/ml. | | | | AUC, γ-hours/ ml. | Data Plotted in— |
|---|---|---|---|---|---|---|
| | 1 hr. | 4 hr. | 7 hr. | 24 hr. | | |
| 6-deoxy-6-demethyltetracycline-Al-Ca-Gluconate (1:4:5:12 molar ratio) | 13.2 | 10.2 | 8.40 | 3.72 | 172.6 | Fig. 2. |
| 6-deoxy-6-demethyltetracycline Standard Formulation | 2.84 | 2.25 | 1.92 | 0.74 | 37.9 | Fig. 2. |
| 6-demethyltetracycline-Al-Ca-Gluconate (1:4:5:12 molar ratio) | 8.0 | 4.8 | 3.1 | 0.48 | 65.5 | Fig. 3. |
| 6-demethyltetracycline Standard Formulation | 0.5 | 0.47 | 0.38 | 0.24 | 8.3 | Fig. 3. |
| 6-deoxytetracycline-Al-Ca-Gluconate (1:4:5:12 molar ratio) | 2.76 | 2.22 | 1.87 | 1.0 | 39.4 | Fig. 4. |
| 6-deoxytetracycline Standard Formulation | 0.66 | 0.78 | 0.76 | 0.28 | 13.6 | Fig. 4. |
| 7-chloro-6-demethyltetracycline-Al-Ca-Gluconate (1:4:5:12 molar ratio) | 9.5 | 6.9 | 4.2 | 1.2 | 91.9 | Fig. 5. |
| 7-chloro-6-demethyltetracycline Standard Formulation | 2.9 | 4.0 | 2.4 | 1.9 | 58.0 | Fig. 5. |

TABLE III

*Intramuscular dog blood levels*

[Dose: 1.5 mg. antibiotic injected per pound of dog body weight]

Figure 6:
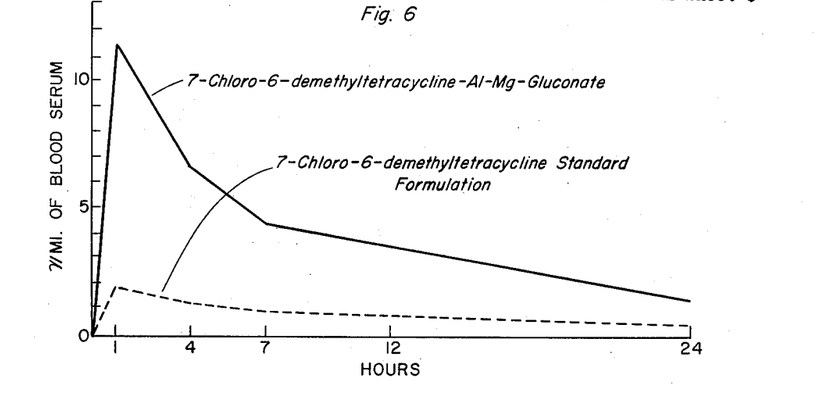
Figure 9:
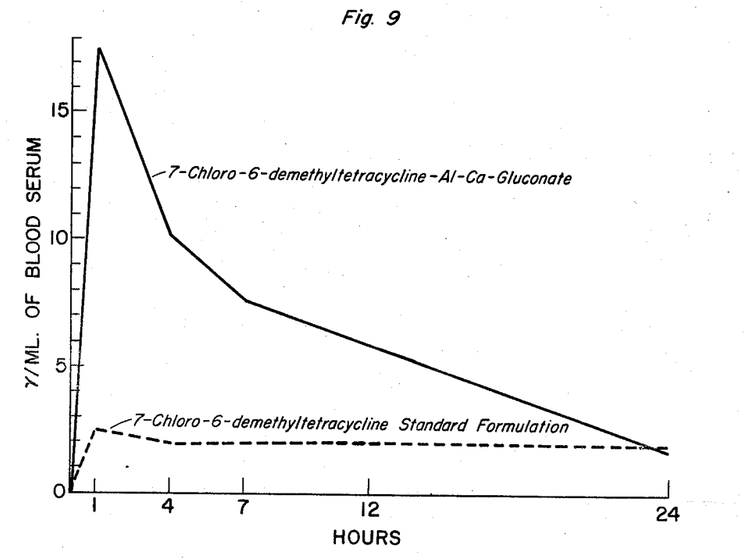
Figure 10:
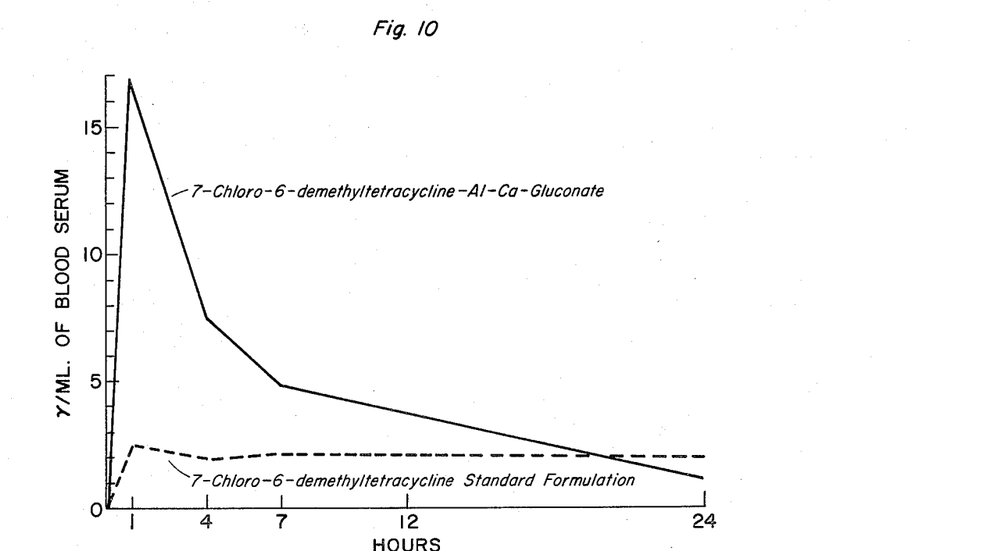
Figure 11:
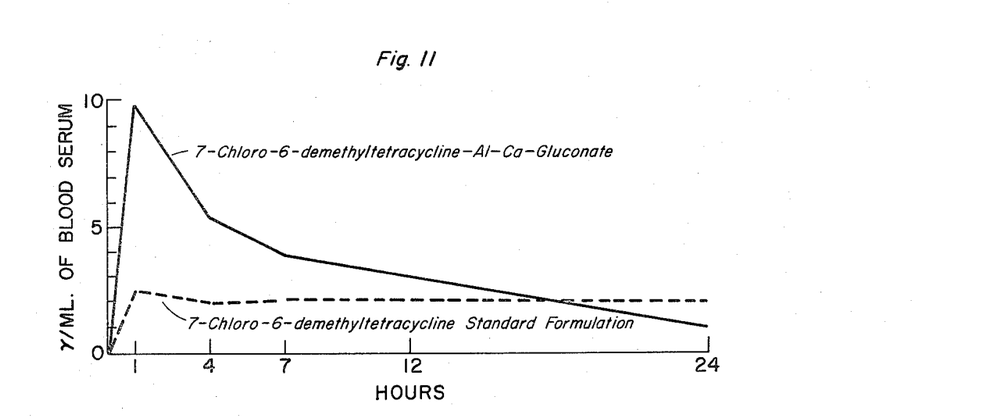

| Sample | Blood Levels, γ of antibiotic/ml. | | | | AUC, γ-hours/ ml. | Data Plotted in— |
|---|---|---|---|---|---|---|
| | 1 hr. | 4 hr. | 7 hr. | 24 hr. | | |
| 7-chloro-6-demethyltetracycline-Al-Mg-Gluconate (1:4:5:12 molar ratio) | 11.5 | 6.60 | 4.40 | 1.50 | 99.6 | Fig. 6. |
| 7-chloro-6-demethyltetracycline Standard Formulation | 1.81 | 1.17 | 0.92 | 0.47 | 20.3 | Fig. 6. |
| 7-chloro-6-demethyltetracycline-Al-Ca-Gluconate (1:2:1:4 molar ratio) | 17.5 | 10.0 | 7.57 | 1.75 | 155.6 | Fig. 9. |
| 7-chloro-6-demethyltetracycline Standard Formulation | 2.49 | 1.95 | 2.04 | 1.89 | 47.3 | Fig. 9. |
| 7-chloro-6-demethyltetracycline-Al-Ca-Gluconate (1:3:1:6 molar ratio) | 16.9 | 7.44 | 4.80 | 1.02 | 112.8 | Fig. 10. |
| 7-chloro-6-demethyltetracycline Standard Formulation | 2.49 | 1.95 | 2.04 | 1.89 | 47.3 | Fig. 10. |
| 7-chloro-6-demethyltetracycline-Al-Ca-Gluconate (1:4:2:6 molar ratio) | 9.80 | 5.25 | 3.85 | 0.93 | 81.8 | Fig. 11. |
| 7-chloro-6-demethyltetracycline Standard Formulation | 2.49 | 1.95 | 2.04 | 1.89 | 47.3 | Fig. 11. |

TABLE IV

Intramuscular rat blood levels

[Dose: 62.5 mg. antibiotic injected per 300 g. of rat body weight]

Figure 7:
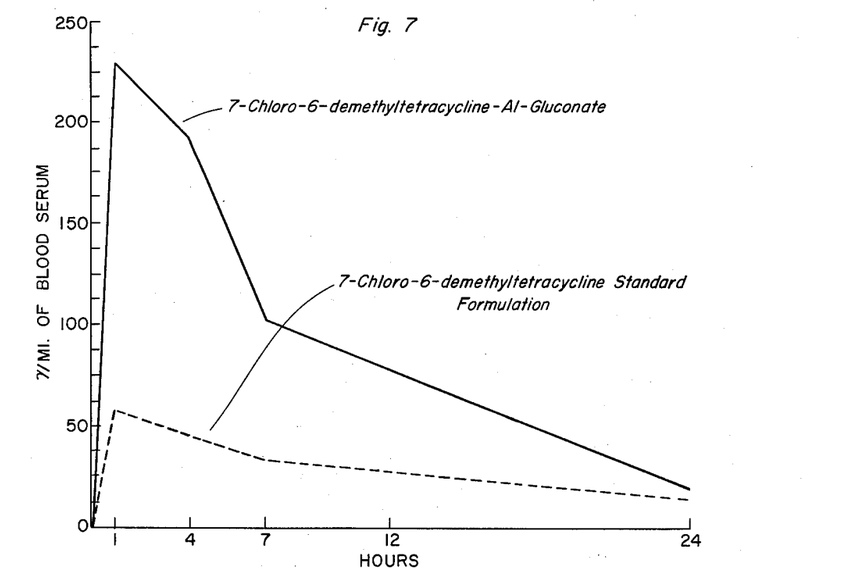

| Sample | Blood Levels, γ of antibiotic/ml. | | | | AUC, γ-hours/ml. | Data Plotted in— |
|---|---|---|---|---|---|---|
| | 1 hr. | 4 hr. | 7 hr. | 24 hr. | | |
| 7-chloro-6-demethyltetracycline-Al-Gluconate (1:4:6.6 molar ratio) | 228.4 | 192.6 | 102.8 | 17.4 | 2,210.5 | Fig. 7. |
| 7-chloro-6-demethyltetracycline Standard Formulation. | 56.7 | 44.4 | 32.1 | 14.0 | 686.6 | Fig. 7. |

The complexes of the present invention may be administered in solution either in water or in aqueous propylene glycol. The unusual solubility of the complexes of the present invention permits high concentrations to be administered. However, since much higher blood level AUC values are obtained with the complexes of the tetracycline antibiotics of the present invention as compared with the complexes of the tetracycline antibiotics described by Ritter, ordinarily lower concentrations or smaller doses are administered. This dose reduction results in a substantial lessening of tissue irritation at the site of injection, while still producing therapeutic blood levels.

The complexes may be most conveniently formed in aqueous solution. The antibiotic, the aluminum, and the gluconic acid may be added in any form which will release the antibiotic, the aluminum ions, and the gluconate ions for complex formation. It is preferred that the aluminum ions first react with the gluconate ions, and then the antibiotic be added to this reaction product. Where the four component complex is desired, the complex forming cations of calcium and magnesium may then be added in the form of their oxides, hydroxides, or soluble salts. The complex may be used in the aqueous solution in which formed or it may be recovered from the solution by diluting it out with a water-soluble organic solvent in which the complex is insoluble, or by evaporation of the water. If the complex is formed in a high concentration it may precipitate out on standing. When desired, the components may be admixed in the proper proportions as a dry formulation to which water may be added in order to obtain the complex in aqueous solution. The aluminum may be added as an alkoxide. Aluminum isopropoxide and aluminum ethoxide are particularly convenient. Other forms of aluminum such as aluminum citrate, aluminum nitrate, aluminum tartrate, aluminum formate, aluminum chloride, aluminum sulfate and potassium aluminum sulfate may be used. The antibiotic may be added as the free base, the hydrochloride, the hydrobromide, the nitrate, the sulfate or as the sodium salt or other alkali metal salt, or as the calcium salt or other alkaline earth metal salt. Effectively, any form of aluminum which is ionizable and any form of the tetracycline antibiotics of the present invention which gives the ionizable form of the antibiotic may be used in preparing the present complexes.

The pH of the aqueous solutions of all the complexes of the present invention may be adjusted to anywhere within the range of from below 1 to about 7, and some will remain in solution at a pH as high as 12. However, the pH range between 3.5 and 8 is preferred for a product designed to be used parenterally in aqueous solution.

When administered in aqueous solution, the complexes may be used at the pH of formation or the pH may be adjusted during their formation or after their formation with sodium hydroxide or other alkali metal hydroxide, or with an alkaline earth metal hydroxide such as calcium hydroxide, or with an organic nitrogen base such as triethylamine, triethanolamine, piperazine, morpholine or diethanolamine.

The complexes of the present invention has been found to be unusually stable in aqueous solutions of propylene glycol having from 20 to 50% by weight of water. Furthermore, very stable solutions of the complexes of the present invention are obtained where the water content of the aqueous propylene glycol solution is from 25 to 30% by weight, and this range is preferred. It has further been discovered that best stability is obtained when the pH of the aqueous propylene glycol vehicle is adjusted to 7.5–9.5 with an organic nitrogen base such as monoethanolamine, diethanolamine, or triethanolamine. The complexes of the present invention are markedly stable in aqueous propylene glycol solutions having a pH range of 8.0–8.5, and this pH range is preferred. The parenterally suitable aqueous propylene glycol solutions of the complexes of the present invention may be most conveniently prepared by suspending the previously isolated complex in a suitable aqueous propylene glycol vehicle, and then titrating with an organic nitrogen base, such as those enumerated above, to pH 7.5–9.5, and then diluting further with water, if necessary.

To the parenteral preparations of the complexes of the present invention, either in water or in aqueous propylene glycol, may be added the usual anti-oxidants such as sodium formaldehyde sulfoxylate, ascorbic acid, or sodium bisulfite. In like manner there may also be added local anesthetics such as procaine and xylocaine.

The formation of the complexes, as is frequent in complex formation, may be a rather slow process and may require from a few minutes to several hours, depending upon conditions. Specific examples of this invention are:

EXAMPLE 1

*6-demethyltetracycline-aluminum-gluconate (1:4:6.6)*

In 100 ml. of water were suspended 6.15 g. of 6-demethyltetracycline and 20.0 g. of aluminum gluconate. The suspension was stirred for half an hour or until an essentially clear solution was obtained. The solution was then filtered and poured into a solution of 2 liters of isopropanol plus 1 liter of petroleum ether (B.P. 60–80° C.). The resulting yellow precipitate was aged for half an hour, collected by filtration, washed with isopropanol, and dried in vacuo over $P_2O_5$ at 30° to 40° C. There was obtained 23.0 g. of the 6-demethyltetracycline-aluminum-gluconate complex.

EXAMPLE 2

*7-chloro-6-demethyltetracycline-aluminum-gluconate (1:4:6.6)*

In 100 ml. of water were suspended 6.65 g. of 7-chloro-6-demethyltetracycline and 20.0 g. of aluminum gluconate. The suspension was stirred for half an hour or until an essentially clear solution was obtained. The solution was then filtered and poured into a solution of 2 liters of isopropanol plus 1 liter of petroleum ether (B.P. 60–80° C.). The resulting yellow precipitate was aged for half an hour, collected by filtration, washed with isopropanol, and dried in vacuo over $P_2O_5$ at 30° to 40° C. There was thus obtained 23.0 g. of the 7-chloro-6-demethyltetracycline-aluminum-gluconate complex.

EXAMPLE 3

*6-demethyltetracycline-aluminum-calcium-gluconate (1:4:5:12)*

In 150 ml. of water were suspended, with stirring, 6.15 g. of 6-demethyltetracycline, 13.8 g. of glucono-δ-lactone, 20.0 g. of aluminum gluconate and 4.0 g. of calcium oxide. The suspension was stirred for half an hour or until an essentially clear solution was obtained. The solution was then filtered and poured into a solution of 2 liters of isopropanol plus 1 liter of petroleum ether (B.P. 60–80° C.). The resulting yellow precipitate was aged for half an hour, collected by filtration, washed with isopropanol, and dried in vacuo over $P_2O_5$ at 30° to 40° C. There was thus obtained 42.1 g. of the 6-demethyltetracycline-aluminum-calcium-gluconate complex.

EXAMPLE 4

*7-chloro-6-demethyltetracycline-aluminum-calcium-gluconate (1:4:5:12)*

In 175 ml. of water was suspended, with stirring, 6.65 g. of 7-chloro-6-demethyltetracycline, 13.8 g. of glucono-δ-lactone, 20.0 g. of aluminum gluconate and 4.0 g. of calcium oxide. The suspension was stirred for half an hour or until an essentially clear solution was obtained. The solution was then filtered and poured into a solution of 2 liters of isopropanol plus 1 liter of petroleum ether (B.P. 60–80° C.). The resulting yellow precipitate was aged for half an hour, collected by filtration, washed with isopropanol, and dried in vacuo over $P_2O_5$ at 30° to 40° C. There was thus obtained 43.3 g. of the 7-chloro-6-demethyltetracycline-aluminum-calcium-gluconate complex.

EXAMPLE 5

*6-deoxytetracycline-aluminum-calcium-gluconate (1:4:5:12)*

In 80 ml. of water were suspended 8.16 g. of aluminum isopropoxide and 21.4 g. of glucono-δ-lactone, and the resulting suspension was stirred for 8 hours. The reaction mixture was then aged at room temperature overnight. Then, 4.3 g. of 6-deoxytetracycline neutral was suspended in 35 ml. of water and the suspension was added to the reaction mixture, with stirring. After 15 minutes, 2.8 g. of calcium oxide was suspended in 35 ml. of water and the suspension was added to the reaction mixture, with stirring. As soon as a clear solution was obtained, the reaction mixture was filtered and the filtrate poured into 4 liters of isopropanol. The resulting precipitate was removed by filtration and dried in vacuo. There was thus obtained 30.0 g. of the 6-deoxytetracycline-aluminum-calcium-gluconate complex.

EXAMPLE 6

*6-deoxy-6-demethyltetracycline-aluminum-calcium-gluconate (1:4:5:12)*

In 80 ml. of water were suspended 8.16 g. of aluminum isopropoxide and 21.4 g. of glucono-δ-lactone, and the resulting suspension was stirred for 8 hours. The reaction mixture was then aged at room temperature overnight. Then, 4.14 g. of 6-deoxy-6-demethyltetracycline neutral was suspended in 35 ml. of water and the suspension was added to the reaction mixture, with stirring. After 15 minutes, 2.8 g. of calcium oxide was suspended in 35 ml. of water and the suspension was added to the reaction mixture, with stirring. As soon as a clear solution was obtained, the reaction mixture was filtered and the filtrate poured into 4 liters of isopropanol. The resulting precipitate was removed by filtration and dried in vacuo. There was thus obtained 29.0 g. of the 6-deoxy-6-demethyltetracycline - aluminum - calcium - gluconate complex.

EXAMPLE 7

*7-chloro-6-demethyltetracycline-aluminum-magnesium-gluconate (1:4:5:12)*

In 100 ml. of water were suspended 16.3 g. of aluminum isopropoxide and 42.7 g. of glucono-δ-lactone, and the resulting suspension was aged for about 24 hours with some stirring. Then, 9.3 g. of 7-chloro-6-demethyltetracycline neutral was suspended in 50 ml. of water and the suspension was added to the essentially clear aluminum gluconate solution with stirring. As soon as a clear solution was obtained, a suspension of 4.0 g. of magnesium oxide in 50 ml. of water was added to the reaction mixture and stirring was continued until a clear solution was again obtained. The solution was filtered and poured into a solution of 2 liters of isopropanol plus 500 ml. of petroleum ether (B.P. 60–80° C.). The resulting precipitate was removed by filtration and dried in vacuo. There was thus obtained 54.0 g. of the 7-chloro-6-demethyltetracycline-aluminum-magnesium-gluconate complex.

EXAMPLE 8

*7-chloro-6-demethyltetracycline-aluminum-calcium-gluconate (1:6:5:12)*

In 100 ml. of water were suspended 24.5 g. of aluminum isopropoxide and 42.7 g. of glucono-δ-lactone and the resulting suspension was aged at room temperature overnight. Then, the suspension was stirred and heated until an essentially clear solution resulted. To this was added with stirring 9.3 g. of 7-chloro-6-demethyltetracycline suspended in 50 ml. of water. After 15 minutes, 5.6 g. of calcium oxide was suspended in 50 ml. of water and the suspension was added to the reaction mixture with stirring. As soon as a clear solution was obtained, the reaction mixture was filtered and the filtrate poured into 3.5 liters of isopropanol. The resulting precipitate was removed by filtration and dried in vacuo. There was thus obtained 60.0 g. of the 7-chloro-6-demethyltetracycline-auminum-calcium-gluconate complex.

EXAMPLE 9

*7-chloro-6-demethyltetracycline-aluminum-calcium-gluconate (1:5:5:23)*

In 250 ml. of water were suspended 40.8 g. of aluminum isopropoxide and 162.4 g. of glucono-δ-lactone and the resulting suspension was aged at room temperature overnight. Then, 18.6 g. of 7-chloro-6-demethyltetracycline suspended in 100 ml. of water was added to the mixture with stirring. As soon as a clear solution was obtained, the reaction mixture was filtered and the filtrate frozen and lyophilized. The product was dissolved in water giving a solution containing 35 mg. of 7-chloro-6-demethyltetracycline per ml. To 13.3 ml. of this solution was added with stirring 280 mg. of calcium oxide suspended in 10 ml. of water. As soon as a clear solution was obtained the pH of the reaction mixture was raised by the addition of triethanolamine. At pH 7.5 a precipitate started to form in the solution.

EXAMPLE 10

*7-chloro-6-demethyltetracycline-aluminum-calcium-gluconate (1:5:5:12)*

In 100 ml. of water were suspended 20.4 g. of aluminum isopropoxide and 42.7 g. of glucono-δ-lactone, and the resulting suspension was aged at room temperature overnight. Then the suspension was stirred and heated until an essentially clear solution was obtained. To this was added with stirring 9.3 g. of 7-chloro-6-demthyltetracycline suspended in 50 ml. of water. After 15 minutes, 5.6 g. of calcium oxide was suspended in 50 ml. of water and the suspension was added to the reaction mixture with stirring. As soon as a clear solution was obtained, the reaction mixture was filtered and the filtrate was poured into 3.5 liters of isopropanol. The resulting precipitate was removed by filtration and dried in vacuo. There was thus obtained 64 g. of the 7-chloro-6-demethyltetracycline-aluminum-calcium-gluconate complex.

EXAMPLE 11

*7-chloro-6-demethyltetracycline-aluminum-calcium-gluconate (1:5:1:23)*

In 250 ml. of water were suspended 40.8 g. of aluminum isopropoxide and 162.4 g. of glucono-δ-lactone and the resulting suspension was aged at room temperature overnight. To this was added with stirring 18.6 g. of 7-chloro-6-demethyltetracycline suspended in 100 ml. of water. As soon as a clear solution was obtained, the reaction mixture was filtered and the filtrate frozen and lyophilized. The product was dissolved in water giving a solution containing 35 mg. of 7-chloro-6-demethyltetracycline per ml. To 13.3 ml. of this solution was added with stirring 56 mg. of calcium oxide suspended in 20 ml. of water. As soon as a clear solution was obtained the pH of the reaction mixture was raised by the addition of triethanolamine. At a pH of about 7.8 a precipitate started to form in the solution.

EXAMPLE 12

*7-chloro-6-demethyltetracycline-aluminum-calcium-gluconate (1:4:4:9)*

In 150 ml. of water were suspended with stirring 12.2 g. of aluminum isopropoxide and 32.0 g. of glucono-δ-lactone and the resulting suspension was stirred for 20 hours. The resulting essentially clear aluminum-gluconate solution was filtered, and to the filtrate was added with stirring 9.3 g. of 7-chloro-6-demethyltetracycline suspended in 20 ml. of water. After 15 minutes, 4.5 g. of calcium oxide suspended in 20 ml. of water was added and stirring continued until a clear solution was again obtained. This was filtered and the filtrate poured into 2000 ml. of isopropanol. The resulting precipitate was removed by filtration and dried in vacuo. There was thus obtained 46 g. of the 7-chloro-6-demethyltetracycline-aluminum-calcium-gluconate complex.

EXAMPLE 13

*7-chloro-6-demethyltetracycline-aluminum-calcium-gluconate (1:4:3:12)*

In 100 ml. of water were suspended with stirring 8.16 g. of aluminum isopropoxide and 21.4 g. of glucono-δ-lactone and the resulting suspension was stirred overnight. The resulting essentially clear aluminum-gluconate solution was filtered, and to the filtrate was added with stirring 4.65 g. of 7-chloro-6-demethyltetracycline suspended in 20 ml. of water. After 15 minutes, 1.7 g. of calcium oxide suspended in 20 ml. of water was added and stirring continued until a clear solution was again obtained. The solution was then filtered and the filtrate poured into 1000 ml. of isopropanol. The resulting precipitate was removed by filtration and dried in vacuo. There was thus obtained 26.0 g. of the 7-chloro-6-demethyltetracycline-aluminum-calcium-gluconate complex.

EXAMPLE 14

*7-chloro-6-demethyltetracycline-aluminum-calcium-gluconate (1:4:3:8)*

In 100 ml. of water were suspended with stirring 16.3 g. of aluminum isopropoxide and 28.5 g. of glucono-δ-lactone and the resulting suspension was stirred overnight. The resulting essentially clear aluminum-gluconate solution was filtered, and to the filtrate was added with stirring 9.3 g. of 7-chloro-6-demethyltetracycline suspended in 20 ml. of water. After 15 minutes, 3.4 g. of calcium oxide suspended in 20 ml. of water was added and stirring continued until a clear solution was again obtained. The solution was then filtered and the filtrate poured into 2000 ml. of isopropanol. The resulting precipitate was removed by filtration and dried in vacuo. There was thus obtained 45 g. of the 7-chloro-6-demethyltetracycline-aluminum-calcium-gluconate complex.

EXAMPLE 15

*7-chloro-6-demethyltetracycline-aluminum-calcium-gluconate (1:4:2:12)*

In 200 ml. of water were suspended with stirring 32.6 g. of aluminum isopropoxide and 85.6 g. of glucono-δ-lactone and the resulting suspension was stirred overnight. The resulting essentially clear aluminum-gluconate solution was filtered, and to the filtrate was added with stirring 18.6 g. of 7-chloro-6-demethyltetracycline suspended in 50 ml. of water. After 15 minutes, 4.5 g. of calcium oxide suspended in 50 ml. of water was added and stirring continued until a clear solution was again obtained. The solution was then filtered and the filtrate poured into 4000 ml. of isopropanol. The resulting precipitate was removed by filtration and dried in vacuo. There was thus obtained 100 g. of the 7-chloro-6-demethyltetracycline-aluminum-calcium-gluconate complex.

EXAMPLE 16

*7-chloro-6-demethyltetracycline-aluminum-calcium-gluconate (1:4:2:9)*

In 150 ml. of water were suspended with stirring 32.6 g. of aluminum isopropoxide and 64.1 g. of glucono-δ-lactone and the resulting suspension was stirred overnight. The resulting essentially clear aluminum-gluconate solution was filtered, and to the filtrate was added with stirring 18.6 g. of 7-chloro-6-demethyltetracycline suspended in 50 ml. of water. After 15 minutes, 4.5 g. of calcium oxide suspended in 50 ml. of water was added and stirring continued until a clear solution was again obtained. The solution was then filtered and the filtrate poured into 3000 ml. of isopropanol. The resulting precipitate was removed by filtration and dried in vacuo. There was thus obtained 95 g. of the 7-chloro-6-demethyltetracycline-aluminum-calcium-gluconate complex.

EXAMPLE 17

*7 - chloro - 6 - demethyltetracycline - aluminum - calcium-gluconate (1:4:1:12)*

In 250 ml. of water were suspended with stirring 32.6 g. of aluminum isopropoxide and 85.6 g. of glucono-δ-lactone and the resulting suspension was stirred overnight. The resulting essentially clear aluminum-gluconate solution was filtered, and to the filtrate was added with stirring 18.6 g. of 7-chloro-6-demethyltetracycline suspended in 50 ml. of water. After 15 minutes, 2.4 g. of calcium oxide suspended in 50 ml. of water was added and stirring continued until a clear solution was again obtained. The solution was filtered and the filtrate frozen and lyophilized. There was thus obtained 119 g. of the 7 - chloro - 6 - demethyltetracycline - aluminum - calcium-gluconate complex.

EXAMPLE 18

*7 - chloro - 6 - demethyltetracycline - aluminum - calcium-gluconate (1:3:1:6)*

In 500 ml. of water were suspended with stirring 61.2 g. of aluminum isopropoxide and 106.8 g. of glucono-δ-lactone and the resulting suspension was stirred overnight. The resulting essentially clear aluminum-gluconate solution was filtered, and to the filtrate was added with stirring 46.5 g. of 7-chloro-6-demethyltetracycline suspended in 150 ml. of water. After 15 minutes, 5.6 g. of calcium oxide suspended in 150 ml. of water was added and stirring continued until a clear solution was again obtained. The solution was filtered and the filtrate frozen and lyophilized. There was thus obtained 175 g. of the 7 - chloro - 6 - demethyltetracycline - aluminum - calcium-gluconate complex.

EXAMPLE 19

*7 - chloro - 6 - demethyltetracycline - aluminum - calcium-gluconate (1:1:1:2)*

In 75 ml. of water were suspended with stirring 2.04 g. of aluminum isopropoxide and 2.56 g. of glucono-δ-lactone and the resulting suspension was stirred overnight. The resulting essentially clear aluminum-gluconate solution was filtered, and to the filtrate was added with stirring 4.65 g. of 7-chloro-6-demethyltetracycline suspended in 25 ml. of water. After 15 minutes, 0.6 g. of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 4.8 g. of the 7-chloro-6-demethyltetracycline-aluminum-calcium-gluconate complex.

EXAMPLE 20

*7 - chloro - 6 - demethyltetracycline - aluminum - calcium-gluconate (1:2:1:4)*

In 75 ml. of water were suspended with stirring 4.08 g. of aluminum isopropoxide and 7.12 g. of glucono-δ-lactone and the resulting suspension was stirred overnight. The resulting essentially clear aluminum-gluconate solution was filtered, and to the filtrate was added with stirring 4.65 g. of 7-chloro-6-demethyltetracycline suspended in 25 ml. of water. After 15 minutes, 0.6 g. of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 12.0 g. of the 7-chloro-6-demethyltetracycline-aluminum-calcium-gluconate complex.

EXAMPLE 21

*7 - chloro - 6 - demethyltetracycline - aluminum - calcium-gluconate (1:2:1:6)*

In 75 ml. of water were suspended with stirring 4.08 g. of aluminum isopropoxide and 10.7 g. of glucono-δ-lactone and the resulting suspension was stirred overnight. The resulting essentially clear aluminum-gluconate solution was filtered, and to the filtrate was added with stirring 4.65 g. of 7-chloro-6-demethyltetracycline suspended in 25 ml. of water. After 15 minutes, 0.6 g. of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 14.0 g. of the 7-chloro-6-demethyltetracycline-aluminum-calcium-gluconate complex.

EXAMPLE 22

*7 - chloro - 6 - demethyltetracycline - aluminum - calcium-gluconate (1:3:2:7)*

In 100 ml. of water were suspended with stirring 12.2 g. of aluminum isopropoxide and 24.9 g. of glucono-δ-lactone and the resulting suspension was stirred overnight. The resulting essentially clear aluminum-gluconate solution was filtered, and to the filtrate was added with stirring 9.3 g. of 7-chloro-6-demethyltetracycline suspended in 25 ml. of water. After 15 minutes, 2.2 g. of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 38.0 g. of 7 - chloro - 6 - demethyltetracycline - aluminum - calcium-gluconate complex.

EXAMPLE 23

*7-chloro-6-demethyltetracycline-aluminum-calcium-gluconate (1:2:2:6)*

In 100 ml. of water were suspended with stirring 8.2 g. of aluminum isopropoxide and 21.4 g. of glucono-δ-lactone and the resulting suspension was stirred overnight. The resulting essentially clear aluminum-gluconate solution was filtered, and to the filtrate was added with stirring 9.3 g. of 7-chloro-6-demethyltetracycline suspended in 20 ml. of water. After 15 minutes, 2.2 g. of calcium oxide suspended in 20 ml. of water was added and stirring continued until a clear solution was again obtained. The solution was then filtered and the filtrate poured into 2000 ml. of isopropanol. The resulting precipitate was removed by filtration and dried in vacuo. There was thus obtained 33.0 g. of the 7-chloro-6-demethyltetracycline-aluminum-calcium-gluconate complex.

EXAMPLE 24

*7-chloro-6-demethyltetracycline-aluminum-calcium-gluconate (1:3:4:9)*

In 150 ml. of water were suspended with stirring 12.2 g. of aluminum isopropoxide and 32.0 g. of glucono-δ-lactone and the resulting suspension was stirred overnight. The resulting essentially clear aluminum-gluconate solution was filtered, and to the filtrate was added with stirring 9.3 g. of 7-chloro-6-demethyltetracycline suspended in 25 ml. of water. After 15 minutes, 4.5 g. of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 41.0 g. of the 7-chloro-6-demethyltetracycline-aluminum-calcium-gluconate complex.

EXAMPLE 25

*7-chloro-6-demethyltetracycline-aluminum-calcium-gluconate (1:4:2:6)*

In 90 ml. of water were suspended with stirring 8.16 g. of aluminum isopropoxide and 10.7 g. of glucono-δ-lactone and the resulting suspension was stirred overnight. The resulting essentially clear aluminum-gluconate solution was filtered, and to the filtrate was added with stirring 4.65 g. of 7-chloro-6-demethyltetracycline suspended in 20 ml. of water. After 15 minutes, 1.1 g. of calcium oxide suspended in 20 ml. of water was added and stirring continued until a clear solution was again obtained. The solution was then filtered and the filtrate poured into 3000 ml. of isopropanol. The resulting precipitate was removed by filtration and dried in vacuo. There was thus obtained 16.0 g. of the 7-chloro - 6 - demethyltetracycline-aluminum-calcium-gluconate complex.

EXAMPLE 26

*7-chloro-6-demethyltetracycline-aluminum-calcium-gluconate (1:4:1.5:12)*

In 350 ml. of water were suspended with stirring 81.6 g. of aluminum isopropoxide and 213.6 g. of glucono-δ-lactone and the resulting suspension was stirred overnight. The resulting essentially clear aluminum-gluconate solution was filtered, and to the filtrate was added with stirring 46.5 g. of 7-chloro-6-demethyltetracycline suspended in 100 ml. of water. After 15 minutes, 8.4 g. of calcium oxide suspended in 50 ml. of water was added and stirring continued until a clear solution was again obtained. The solution was then filtered and the filtrate poured into 6000 ml. of isopropanol. The resulting precipitate was removed by filtration and dried in vacuo. There was thus obtained 275 g. of the 7-chloro-6-demethyltetracycline-aluminum-calcium-gluconate complex.

EXAMPLE 27

*6-demethyltetracycline-aluminum-calcium-gluconate (1:3:1:6)*

In 300 ml. of water were suspended with stirring 30.6 g. of aluminum isopropoxide and 53.4 g. of glucono-δ-lactone and the resulting suspension was stirred overnight. The resulting essentially clear aluminum-gluconate solution was filtered, and to the filtrate was added with stirring 21.5 g. of 6-demethyltetracycline suspended in 100 ml. of water. After 15 minutes, 2.8 g. of calcium oxide suspended in 100 ml. of water was added and stirring continued until a clear solution was again obtained. The solution was filtered and the filtrate frozen and lyophilized. There was thus obtained 86 g. of the 6-demethyltetracycline-aluminum-calcium-gluconate complex.

EXAMPLE 28

*6-demethyltetracycline-aluminum-calcium-gluconate (1:4:1:12)*

In 300 ml. of water were suspended with stirring 40.8 g. of aluminum isopropoxide and 106.8 g. of glucono-δ-lactone and the resulting suspension was stirred overnight. The resulting essentially clear aluminum-gluconate solution was filtered, and to the filtrate was added with stirring 21.5 g. of 6-demethyltetracycline suspended in 100 ml. of water. After 15 minutes, 2.8 g. of calcium oxide suspended in 100 ml. of water was added and stirring continued until a clear solution was again obtained. The solution was filtered and the filtrate frozen and lyophilized. There was thus obtained 148 g. of the 6 - demethyltetracycline - aluminum - calcium - gluconate complex.

EXAMPLE 29

In 30 ml. of distilled water was dissolved 44.1 g. of 7-chloro - 6 - demethyltetracycline-aluminum-calcium-gluconate complex (1:4:1:12), with stirring. After the complex was completely dissolved, 119 ml. of propylene glycol was added, with stirring. A solution of 850 mg. of sodium formaldehyde sulfoxylate in 3 ml. of distilled water was then added to the formulation. The pH of this solution was then raised to 8.5 with ethanolamine and the volume was made up to 170 ml. with distilled water. The formulation was filtered through a fine sintered glass filter, filled into 2 ml. ampules, and sealed under nitrogen.

EXAMPLE 30

In 30 ml. of distilled water was dissolved 29.0 g. of 6-demethyltetracycline-aluminum-calcium-gluconate complex (1:3:1:6), with stirring. After the complex was completely dissolved, 119 ml. of propylene glycol was added, with stirring. A solution of 850 mg. of sodium formaldehyde sulfoxylate in 3 ml. of distilled water was then added to the formulation. The pH of this solution was then raised to 8.5 with ethanolamine and the volume was made up to 170 ml. with distilled water. The formulation was filtered through a fine sintered glass filter, filled into 2 ml. ampules, and sealed under nitrogen.

This application is a continuation-in-part of our co-pending application Serial No. 23,763, filed April 21, 1960, now abandoned.

What is claimed is:

A stable pharmaceutical product adapted for parenteral use comprising a solution of a complex of a broad spectrum antibiotic selected from the group consisting of 6-deoxy-6-demethyltetracycline, 6-demethyl tetracycline, 6-deoxytetracycline, and 7-chloro-6-demethyltetracycline; aluminum; a cation selected from the group consisting of the cations of hydrogen, calcium and magnesium; and gluconic acid; said components being present in the molar ratio of antibiotic to aluminum to cation to acid of not less than 1:1:1:1 and not greater than 1:6:9:28 dissolved in an aqueous propylene glycol solution having from 20% to 50% by weight of water, and said solution having a pH within the range of from 7.5 to 9.5.

References Cited in the file of this patent

UNITED STATES PATENTS

| | | |
|---|---|---|
| 2,736,725 | Ritter | Feb. 28, 1956 |
| 2,878,289 | McCormick et al. | Mar. 17, 1959 |
| 2,976,318 | Blackwood | Mar. 21, 1961 |
| 3,005,024 | Rennhard | Oct. 17, 1961 |
| 3,005,754 | Granatek | Oct. 24, 1961 |
| 3,068,264 | Sieger et al | Dec. 11, 1962 |

OTHER REFERENCES

Stephens et al.. "Journ. Am. Chem. Soc.," vol. 80, pages 5324–25 (1958).